United States Patent [19]

Shimizu et al.

[11] Patent Number: 5,153,281
[45] Date of Patent: Oct. 6, 1992

[54] METHOD OF PREVENTING POLYMER SCALE DEPOSITION AND POLYMER SCALE PREVENTIVE AGENT USED THEREFOR

[75] Inventors: Toshihide Shimizu, Urayasu; Takanori Sato, Naka, both of Japan

[73] Assignee: Shin-Etsu Chemical Co., Ltd., Tokyo, Japan

[21] Appl. No.: 705,554

[22] Filed: May 24, 1991

[30] Foreign Application Priority Data

May 25, 1990 [JP] Japan .................. 2-135678

[51] Int. Cl.$^5$ .................................. C08F 2/00
[52] U.S. Cl. ........................ 526/62; 526/74; 526/200
[58] Field of Search ............... 526/62, 74, 200

[56] References Cited

U.S. PATENT DOCUMENTS 4,182,809 1/1980 Hong et al. ................ 526/62
4,657,820 4/1987 Halpern et al. .

FOREIGN PATENT DOCUMENTS 0387637 9/1990 European Pat. Off. .

OTHER PUBLICATIONS

Patent Abstracts of Japan, vol. 12, No. 450 (C-547) [3297], Nov. 25, 1988; & JP-A-63 175 002 (Shin Etsu Chem. Co., Ltd) Jul. 19, 1988 *abstract*.

Primary Examiner—Joseph L. Schofer
Assistant Examiner—Tom Weber
Attorney, Agent, or Firm—Oblon, Spivak, McClelland, Maier & Neustadt

[57] ABSTRACT

A method of preventing polymer scale deposition during polymerization of a monomer having an ethylenically double bond in a polymerization vessel, comprising the step of carrying out said polymerization in a polymerization vessel of which the inner wall surface has a coating comprising a water-soluble polysaccharide; and a polymer scale preventive agent comprising polysaccharide. By use of the method or agent, deposition of polymer scale can be effectively prevented; in addition, polymers with a high whiteness can be prepared. Moreover, the scale preventive agent used has no poisonousness or the like and is highly safe.

11 Claims, No Drawings

METHOD OF PREVENTING POLYMER SCALE DEPOSITION AND POLYMER SCALE PREVENTIVE AGENT USED THEREFOR

BACKGROUND OF THE INVENTION

1. Field of the Invention

The present invention relates to a method of preventing polymer scale deposition in polymerization of a monomer having an ethylenic double bond, and a polymer scale preventive agent used for the method.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel, methods in which substances exemplified below are coated on the inner wall surface, etc. as a scale preventive agent, have been proposed. For example, particular polar organic compounds (Japanese Patent Publication (KOKOKU) No. 45-30343(1970), a dye or pigment (Japanese Patent Publication (KOKOKU) No. 45-30835(1970), an aromatic amine compound (Japanese Pre-examination Patent Publication (KOKAI) No. 51-50887(1976)) and a reaction product of a phenolic compound and an aromatic aldehyde (Japanese Pre-examination Patent Publication (KOKAI) No. 55-54317(1980)).

These methods can fairly effectively prevent the deposition of polymer scale in the polymerization of a vinyl halide monomer such as vinyl chloride or a monomer mixture mainly comprised of such a monomer.

In the meantime, vinyl chloride polymers obtained by polymerization are required to have a good whiteness; for example, they are required to have an L value according to the Hunter's color difference equation, which is described below, of 70 or more.

The prior art polymer scale preventive agents generally include a great number of colored substances as exemplified typically by the dyes and pigments described in Japanese Patent Publication (KOKOKU) No. 45-30835(1970) or 52-24953(1977), the aromatic amine compounds described in Japanese Pre-examination Patent Publication (KOKAI) No. 51-50887(1976), and the reaction products of a phenolic compound and an aromatic aldehyde described in Japanese Pre-examination Patent Publication (KOKAI) No. 55-54317(1980). Although these polymer scale preventive agents can fairly effectively prevent polymer scale deposition in the polymerization of a vinyl halide monomer such as vinyl chloride or a monomer mixture mainly comprising a vinyl halide as mentioned above, where the coating comprising such a colored polymer scale preventive agent is dissolved, causing contamination of the produced polymer, a problem may arise that the produced polymer become colored and its quality is seriously lowered. That is, according to measurement of the lightness L in the Hunter's equation described in JIS Z 8730 (1980), the L may be measured to be 65 or less, and coloration is thereby confirmed. Presumably, the coloration is caused by incorporation of components of the coating which has dissolved or peeled into the polymerization system.

Moreover, terrible substance such as aniline, nitrobenzene, formaldehyde, etc. among the polar compounds described in the above-mentioned Japanese Patent Publication (KOKOKU) No. 45-30343(1970), and dyes containing a heavy metal such as chromium or lead among the dyes described in Japanese Patent Publication (KOKOKU) No. 45-30835(1970) are poisonous. The dyes described in Japanese Patent Publication (KOKOKU) Nos. 45-30835(1970) and 52-24953(1977) include some dyes that involve concern about carcinogenesis. Therefore, use of these substances may cause problems in safety of operators.

SUMMARY OF THE INVENTION

An object of the present invention is to provide polymer scale preventive agent which are capable of preventing polymer scale deposition effectively, puts no color to product polymers to thereby produce the polymers with high whiteness, and are not poisonous and therefore causes no concern with respect to safety, and a method of preventing polymer scale deposition using the same.

The inventors of the present invention, as the result of intensive research, have discovered that formation of a coating comprising a water-soluble basic polysaccharide on the inner surfaces of a polymerization vessel enables the solution of the problems described above.

Thus, the present invention provides, as a means of solving said problems, a method of preventing polymer scale deposition in polymerization of a monomer having an ethylenic double bond in a polymerization vessel, which comprises carrying out said polymerization in a polymerization vessel having a coating comprising a water-soluble basic polysaccharide on the inner wall surfaces.

The present invention also provides a polymer scale preventive agent for use in polymerization of a monomer having an ethylenic double bond, comprising a water-soluble basic polysaccharide.

According to the present invention, deposition of polymer scale can be effectively prevented; in addition, high whiteness polymers with an L value of 70 or more can be prepared. Moreover, the scale preventive agent used has no poisonousness or the like and is highly safe; hence there is no problem about safety or sanitation of operators.

Further, according to the present invention, polymer scale deposition can be effectively prevented, irrespectively of polymerization conditions such as the kinds of a monomer or a polymerization initiator, polymerization form, the kind of the material constituting the inner wall of polymerization vessels, etc. That is, deposition of polymer scale can be effectively prevented, for example, on polymerization in which polymer scale deposition has been difficult to prevent, in the case where a polymerization vessel made of stainless steel in which polymer scale has been liable to deposit is used, or in the case where a polymerization initiator with a strong oxidizing action such as potassium peroxodisulfate and the like is used.

Accordingly, where polymerization is carried out by application of the present invention, the operation of removing polymer scale is not required to be conducted every polymerization run; therefore productivity is improved and product polymers with no color of high quality can be produced.

DETAILED DESCRIPTION OF PREFERRED EMBODIMENTS

Water-soluble basic polysaccharide

The water-soluble basic polysaccharide used in the method of the present invention includes, for example, chitosans, water soluble chitosan derivatives, polygalactosamines, water-soluble polygalactosamine derivatives and water-soluble chitin derivatives.

Chitosans are a straight chain polysaccharide (poly-1,4-$\beta$-glucosamine) formed by polymerization through $\beta$-1,4 linkage of D-glucosamine. It can be obtained by deacetylization of chitin contained in the carapace of the Crustacea such as prawns, shrimps and crabs. Recently a chitosan can be produced by culturing a mold, and the chitosan thus produced can be used in the same manner as those naturally occurring. The chitosans are insoluble in water under the neutral conditions, but soluble under the acidic conditions; hence the chitosans are used under a pH of less than 7.

The water-soluble chitosan derivatives which may be used in the method of the present invention include the following:

(1) Organic acid salts and inorganic acid salts of chitosans. The organic acid specifically includes, for example, acetic acid, glycollic acid, malic acid, citric acid, and ascorbic acid. The inorganic acid includes, for example, hydrochloric acid, sulfuric acid, nitric acid and phosphoric acid. Chitosans preferably have a deacetylization degree of 40 to 100%.

(2) Water-soluble low molecular products obtained by decomposition of chitosans, i.e., water-soluble glucosamine oligomers. Normally, 5 to 20-mers of glucosamine are preferred. Such oligomers can be produced by conventional depolymerization methods, for example, the hydrochloric acid hydrolysis method (Japanese preexamination patent publication (kokai) No. 61-21102 (1986), the nitrous acid decomposition method (Japanese pre-examination patent publication (kokai) No. 62-184002 (1987), the chlorine decomposition method (Japanese preexamination patent publication (KOKAI) No. 60-186504(1985), the phosphoric acid decomposition method and decomposition methods using an enzyme or microorganism.

(3) Water-soluble derivatives of chitosans prepared by introducing a hydrophilic group thereinto. Examples are described in Japanese pre-examination patent publication No. 63-14714 (1988) and include polyoxyethylene chitosans, polyoxypropylene chitosans, phophated chitosans, N-glycidyltrimethylammonium chitosans, and dihydoropropylchitosans.

The polygalactosamines which may be used in the method of the present invention are in soluble in water under the neutral conditions, but soluble under a pH of 7 or less and therefore used under such conditions. Polygalactosamines can be produced by culturing a mold (APPLICATION OF CHITIN AND CHITOSAN pp. 24-26 (Society for Research of Chitin and Chitosan ed. 1990, published by Giho-do Shuppan). The water-soluble polygalactosamines include the following:

(1) Organic acid salts and inorganic acid salts of polygalactosamines including salts of organic acids such as acetic acid, formic acid or the like, and salts of inorganic acids such as hydrochloric acid, nitric acid or the like;

(2) Water-soluble low molecular products obtained by decomposition of polygalactosamines. Normally, 5 to 20-mers of galactosamine are preferred. Such oligomers can be produced by decomposition methods using an enzyme or microorganism.

The water-soluble chitin derivatives which may be used in the method of the present invention, include the following:

(1) Water soluble N-acetylglucosamine oligomers obtained by decmoosition of chitins. Normally, 5 to 20-mers are preferred. Such oligomers can be produced by conventional depolymerization methods, for example, the nitrous acid decomposition method, the formic acid decomposition method, the chlorine decomposition method (Japanese pre-examination patent publication (kokai) No. 62-186504 (1987)) or decomposition methods using an enzyme (e.g., chitinase) or a microorganism.

(2) Water soluble derivatives of chitins prepared by introducing a hydrophilic group thereinto. Examples are described in Japanese pre-examination patent publication (kokai) No. 63-14714(1988) and include polyoxyethylene chitins, polyoxypropylene chitins, phosphated chitins and dihydropropylchitins.

Among the water-soluble basic polysaccharides described above, preferred are the inorganic acid salts and organic acid salts of chitosans having a deacetylization degree of 65% or more and a viscosity at 20° C. in the form of an aqueous solution containing 0.5% by weight of the chitosan and 0.5% by weight of acetic acid of 30 cP or more when measured with a B-type viscometer.

PREFERRED EMBODIMENT

In a preferred embodiment of the present invention, in combination with said water-soluble basic polysaccharide a tannin is used; thereby the polymer scale preventing effect is further enhanced.

The tannin used includes, for example, hydrolyzable tannins such as tannic acid, Chinese gallotannin, nutgalls tannin, sumac tannin, tara tannin, valonia tannin, chestnut tannin, myrobalan tannin, oak tannin, divi-divi tannin, algarobillatannin and the like, and condensed tannins such as gambier tannin, quebrachotannin, mimosa tannin, mangrove tannin, hemlock tannin, spruce tannin, Burma cutch tannin, oak bark tannin, tannin of persimmon and the like. These can be used singly or in combination of two or more. Among the tannins, preferred are tannic acid, Chinese gallotannin, nutgalls tannin, quebracho-tannin, mimosa tannin, oak bark tannin and tannin of persimmon.

The tannin is used normally in an amount of 0.1 to 1,000 parts by weight, preferably 1 to 600 parts by weight, per 100 parts by weight of said water-soluble basic polysaccharide. If the tannin is used in too small an amount or in too large an amount, improvement of the polymer scale preventing effect by virtue of the combined use is reduced.

Preparation of a coating solution

To form the coating by applying the polymer scale preventive agent used in the present invention, the agent is prepared in the form of a solution (hereinafter called coating solution) by disolving the water-soluble polysaccharide and, optionally, the tannin in a suitable solvent. The coating solution is applied to the inner wall surfaces, etc. and then dried.

The concentration of the water-soluble basic polysaccharide or the total concentration of the water-soluble basic polysaccharide and a tannin where the tannin is used in combination in the coating solution is not particularly limited as long as the total coating weight described later is attained, but normally it may be about 0.001 to 15% by weight as solid content.

The solvent used for preparation of the coating solution include, for example, water; alcohols such as methanol, ethanol, propanol, butanol, 2-butanol, 2-methyl-1-propanol, 2-methyl-2-propanol, 3-methyl-1-butanol, 2-methyl-2-butanol, and 2-pentanol; ketones such as acetone, methyl ethyl ketone, and methyl isobutyl ketone; esters such as methyl formate, ethyl formate, methyl acetate, and methyl acetoacetate; ethers such as 4-methyldioxolane, and ethylene glycol diethyl ether; furans; and aprotic solvents such as dimethylformamide, dimethyl sulfoxide, and acetonitrile. These solvents are appropriately used singly or as a mixed solvent of two or more. Moreover, to the polymer scale preventive agent of the present invention, for example, a surfactant (cationic, nonionic or anionic) or the like can be added as long as it does not impair the polymer scale preventing action. An inorganic compound is also optionally added to such an extent that it impairs neither colorlessness nor non-poisonousness which are aimed by the present invention, and as long as it does not impair the scale preventing action.

The inorganic compound includes, for example, silicic acids and silicates such as orthosilicic acid, metasilicic acid, mesosilicic acid, mesotrisilicic acid, mesotetrasilicic acid, sodium metasilicate, sodium orthosilicate, sodium disilicate, sodium tetrasilicate, sodium metasilicate and water glass; metallic compounds such as oxygen acid salts, acetates, nitrates, hydroxides or halides of a metal selected from alkali earth metals such as calcium, zinc family elements such as zinc, aluminum family metals such as aluminum, and platinum family metals such as platinum; and inorganic colloids such as ferric hydroxide colloid, colloid of silicic acid, colloid of barium sulfate, and colloid of aluminum hydroxide. These inorganic colloids can be prepared, for example, by mechanical crushing, irradiation with ultrasonic wave, electrical dispersion or chemical methods.

Formation of coating

The coating solution is applied to the inner wall of a polymerization vessel and then dried sufficiently, followed by washing with water if necessary, to form a coating having a polymer scale deposition preventing effect. Drying may be conducted, for example, at a temperature within the range from room temperature to 100° C.

The coating solution is preferably applied to not only the inner wall surface of a polymerization vessel but also other parts with which the monomer comes into contact during polymerization. For example, it is preferred to apply the coating solution to a stirring shaft, stirring blades, condensers, headers, search coil, bolts, nuts, etc.

More preferably, for formation of the coating, the coating solution is applied to parts on which polymer scale may deposit of recovery system for unreacted monomer, for example, the inner surfaces of monomer distillation columns, condensers, monomer stock tanks and valves.

The coating formed as described above makes it possible to prevent formation of polymer scale on these parts.

The method of applying the coating solution is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the coating solution, is not limited, either. Following methods can be used, for instance. That is, a method in which, after the solution is applied, hot air with an suitable elevated temperature is blown to the coated surface, and a method in which the inner wall surface of a polymerization vessel and the surfaces of other parts to be coated are previously heated to from 30° to 80° C., and the coating solution is directly applied to the heated surfaces, etc. After dried, the coated surfaces are washed with water if necessary.

The coating thus formed has normally a coating weight of the water-soluble basic polysaccharide, or the total of the water-soluble basic polysaccharide and the tannin, of 0.001 g/m$^2$ or more, preferably from 0.05 to 2 g/m$^2$.

The coating operation may be conducted every batch of polymerization. The formed coating has fairly good durability and retains the scale-preventing action; therefore the coating operation is not necessarily performed every batch of polymerization. Normally, the coating may be formed every 1 to ten-odd batches.

Polymerization

After the formation of the coating on the inner wall surface of a polymerization vessel and other parts with which monomer may come into contact by coating operation, polymerization is carried out in accordance with conventional procedures. That is, a monomer having an ethylenic double bond, and a polymerization medium and a dispersing agent, etc. which are optionally used, are charged, followed by carrying out polymerization according to conventional methods.

The monomer having an ethylenic double bond to which the method of this invention can be applied includes, for example, vinyl halides such as vinyl chloride; vinyl esters such as vinyl acetate and vinyl propionate; acrylic acid, methacrylic acid, and esters or salts thereof; maleic acid, fumaric acid, and esters or anhydrides thereof; and diene monomers such as butadiene, chloroprene and isoprene; as well as styrene, acrylonitrile, halogenated vinylidenes, and vinyl ethers.

There are no particular limitations on the form of polymerization to which the method of this invention can be applied. The present invention is effective in any forms of polymerization such as suspension polymerization, emulsion polymerization, solution polymerization, bulk polymerization, and gas phase polymerization. Particularly, the present method is more suitable to polymerizations in an aqueous medium such as suspension or emulsion polymerization.

Specifically, in the case of suspension polymerization and emulsion polymerization, polymerization is generally performed as follows, for instance. First, water and a dispersing agent are charged into a polymerization vessel, and thereafter a polymerization initiator is charged. Subsequently, the inside of the polymerization vessel is evacuated to a pressure of from about 0.1 to about 760 mmHg, and a monomer is then charged (whereupon the pressure inside the polymerization vessel usually becomes from 0.5 to 30 kgf/cm$^2$.G). During the polymerization, one or more of water, a dispersing agent and a polymerization initiator may be added, if necessary. The polymerization is normally carried out at a temperature of from 30° to 150° C. Reaction temperature during the polymerization is different depending on the kind of monomer to be polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator are used in amounts of about 100 to 500 parts by weight, about 0.01 to 30 parts by weight, and about 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged, and then polymerization is carried out at a temperature of from −10° C. to 250° C.

The method of the present invention is effective, independent of materials constituting the inner wall, etc. of a polymerization vessel. For example, this method is effective for polymerization vessels made of a stainless steel or other steels or vessels lined with glass.

Any additive materials that have been added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as trichloroethylene and mercaptans; and pH adjusters.

Said polymer scale preventive agent used in the present invention may be used not only for formation of the coating on the inner wall surfaces, etc. of the polymerization vessel, but also for direct addition to the polymerization system. By this addition, the effect of preventing polymer scale deposition can be expected. In this case, the amount of the polymerization preventive agent to be added preferably ranges form about 10 ppm to 1,000 ppm based on the whole weight of the monomer charged. Care should be taken so that the quality of manufactured polymer with respect to fish eyes, bulk specific gravity, particle size distribution, etc. may not be affected.

EXAMPLES

The present invention is now described in detail by way of working examples and comparative examples. In each of the tables below, Experiment Nos. marked with * indicate comparative examples, and the other Experiment Nos., working examples of the present invention.

EXAMPLE 1

Polymerization was carried out in the following manner using a polymerization vessel with an inner capacity of 1,000 liters and having a stirrer.

In each experiment, first, a water-soluble basic polysaccharide, or a water-soluble basic polysaccharide and a tannin was/were dissolved in a solvent so that the concentration thereof might become the value given in Table 1, to prepare a coating solution. The coating solution was applied to the inner wall and other parts with which a monomer comes into contact including the stirring shaft and stirring blades, followed by drying under heating at 60° C. for 15 min. to form a coating, which was then washed with water. However, Experiment No. 101 is a comparative example in which no coating solution was applied.

The (A) water-soluble basic polysaccharide and (B) tannin, the total concentration thereof and the ratio of (A)/(B) [weight ratio], and the solvent used in each experiment are given in Table 1.

Subsequently, in the polymerization vessel in which a coating had been formed by the coating operation as above, were charged 400 kg of water, 200 kg of vinyl chloride, 250 g of partially saponified polyvinyl alcohol, 25 g of hydroxypropylmethyl cellulose and 75 g of diisopropyl peroxydicarbonate. Then, polymerization was carried out at 57° C. with stirring for 6 hours. After the completion of the polymerization, the amount of polymer scale depositing on the inner wall of the polymerization vessel was measured. Further, the whiteness degree of the polymer obtained in each Experiment was measured according to the following method.

A hundred parts by weight of a polymer, one part by weight of a stabilizing agent TS-101 (product of Akishima Chemical Co.) and 0.5 part by weight of a stabilizing agent C-100J (product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm×4 cm×1.5 cm (thickness), and molded under heating at 160° C. and under the pressure of 65 to 70 kgf/cm² to prepare a test specimen. This test specimen was measured for lightness L in the Hunter's color difference equation described in JIS Z 8730 (1980). Whiteness was evaluated to become higher with increase in L value.

The L value was determined as follows.

(1) The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and receiving of light, the condition d defined in section 4.3.1 of JIS Z 8722 was adopted.

(2) Next, L was calculated based on the equation: $L = 10Y^{\frac{1}{2}}$ described in JIS Z 8730(1980). The closer to 100 the L value, the higher whiteness and the lower the coloration degree.

The results are given in Table 1. For all chitosans used, viscosity and deacetylization degree are given in the table below, together with their suppliers.

| Used Chitosan[4] | Viscosity | Deacetylization degree[3] | Manufacturer |
|---|---|---|---|
| Chitosan (CLH) | 100 cP or more[1] | 80.0% or more | Yaizu Suisankagaku Kogyo K.K. |
| Chitosan (PSH) | 100 cP or less[1] | 80.0% or more | " |
| Chitosan (PSL) | 100 cP or less[1] | 80.0% or more | " |
| Chitosan (90M) | 100~300 cP[1] | 85.0~94.9% | Wako Junyaku Kogyo K.K. |
| Chitosan (100L) | 30~100 cP[1] | 99.0% or more | " |
| Chitosan (70H) | 300~500 cP[1] | 65.0~79.4% | " |
| Chitosan (80H) | 300~500 cP[1] | 75.0~84.9% | " |
| Chitosan (100L) | 30~100 cP[1] | 99.0% or more | " |
| Chitosan (SK-2) | 2 cP or less[2] | 95.0% or more | Koyo Chimical K.K. |
| Chitosan (PEL) | 5 cP or less[2] | 80.0% or more | Wako Junyaku Kogyo K.K. |

(Note)
[1]Viscosity: A 0.5 wt. % chitosan, 0.5 wt. % acetic acid aqueous solution was prepared, and its viscosity was measured at 20° C. with a B-type viscosimeter.
[2]Viscosity: A 1.0 wt. % chitosan, 0.5 wt. % acetic acid aqueous solution was prepared, and its viscosity was measured at 20° C. with a B-type viscosimeter.
[3]Deacetylization degree: measured by the PVSK colloid solution titration method.
[4]Tradenames are indicated in parentheses.

TABLE 1

| | Coating solution | | | | | Amount of scale (g/m²) | L value |
|---|---|---|---|---|---|---|---|
| Exp. No. | (A) Basic polysaccharide*¹ | (B) Tannin | Total concentration (wt. %) | weight ratio (A)/(B) | solvent (weight ratio) | | |
| 101* | — | — | — | 100/0 | — | 1,300 | 73 |
| 102 | Chitosan(80H) (Acetic acid) | — | 0.2 | 100/0 | Water | 9 | 73 |
| 103 | Chitosan(100L) (Citric acid) | — | 0.2 | 100/0 | Water | 10 | 73 |
| 104 | Chitosan(70H) (Ascorbic acid) | — | 0.1 | 100/0 | Water | 11 | 72.5 |
| 105 | Chitosan(PEL) | — | 0.3 | 100/0 | Water | 18 | 72 |
| 106 | Polygalactosamine (Acetic acid) | — | 0.3 | 100/0 | Water | 11 | 73 |
| 107 | Polyoxyethylene chitin | — | 0.3 | 100/0 | Water | 16 | 73 |
| 108 | Chitosan(100L) (Acetic acid) | Tannic acid | 0.1 | 90/10 | Water | 0 | 72 |
| 109 | Chitosan(90M) (Glicolic acid) | Nutgalls-tannin | 0.5 | 70/30 | Water/Methanol (80/20) | 0 | 73 |
| 110 | Chitosan(70H) (Ascorbic acid) | Chinese gallo-tannin | 0.2 | 90/10 | Water/Methanol (50/50) | 0 | 73 |
| 111 | Chitin oligomers obtained by chlorine decomposition method | Tannin of persimmon | 0.5 | 50/50 | Water/Methanol (80/20) | 6 | 72.5 |
| 112 | Chitosan(SK-2) (Acetic acid) | Tannic acid | 0.2 | 90/10 | Water/Methanol (80/20) | 5 | 73 |
| 113 | Phosphated chitosan | Tannic acid | 0.3 | 90/10 | Water/Methanol (50/50) | 3 | 73 |

(Note)
*¹Chitosans were dispersed in water, and thereafter dissolved by addition of an acid. The used acids are given in ( ). The polygalactosamine used has a molecular weight of 300,000 and a product by Higeta Shoyu Co. (Japan).

EXAMPLE 2

In each experiment, first, a water-soluble basic polysaccharide, or a water-soluble basic polysaccharide and a tannin was/were dissolved in a solvent under the conditions shown in Table 2 to prepare a coating solution. The coating solution was then applied to the inner wall, etc. of a polymerization vessel made of stainless steel with a inner capacity of 20 liters and having a stirrer to thereby form a coating.

In the polymerization vessel for which the coating was thus formed, were charged 9 kg of water, 225 g of sodium dodecylbenzenesulfonate, 12 g of t-dodecyl mercaptan, and 13 g of potassium peroxodisulfate. After the inner atmosphere was replaced with a nitrogen gas, 1.3 kg of styrene and 3.8 kg of butadiene were charged, followed by polymerization at 50° C. for 20 hours. After completion of the polymerization, the amount of polymer scale depositing on the inner wall of the polymerization vessel was measured. The results are given in Table 2.

TABLE 2

| Exp. No. | Coating solution | | | | | Amount of scale (g/m²) |
|---|---|---|---|---|---|---|
| | (A) Basic polysaccharide | (B) Tannin | Total concentration (wt. %) | weight ratio (A)/(B) | solvent (weight ratio) | |
| 201* | — | — | — | — | — | 400 |
| 202 | Chitosan(PSH) (Glicolic acid) | — | 0.1 | 100/0 | Water | 16 |
| 203 | Chitosan(90M) (Acetic acid) | — | 0.2 | 100/0 | Water | 16 |
| 204 | Polyoxypropylene chitin | Nutgalls-tannin | 0.3 | 50/50 | Water/Methanol (90/10) | 20 |
| 205 | Chitosan(100L) (Hidrochloric acid) | Tannic acid | 0.2 | 80/20 | Water/Methanol (70/30) | 3 |
| 206 | Polyoxypropylene chitosan (Acetic acid) | Chinese gallotannin | 0.1 | 60/40 | Water/Methanol (50/50) | 7 |

(Note)
Chitosans were dispersed in water, and thereafter dissolved by addition of an acid. The used acids are given in ( ).

We claim:

1. A method of preventing polymer scale deposition in polymerization of a monomer having an ethylenic double bond in a polymerization vessel, which comprises carrying out said polymerization in a polymerization vessel having a coating comprising a water-soluble basic polysaccharide on the inner wall surfaces, said water-soluble basic polysaccharide selected from the group consisting of chitosans;
   organic acid salts of chitosans;
   inorganic acid salts of chitosans;
   glucosamine oligomers having about 5 to abut 20 mers of glucosamine;
   polyoxyethylene chitosans;
   polyoxypropylene chitosans;
   phosphated chitosans;
   N-glycidyltrimethylammonium chitosans;
   dihydropropylchitosans;
   polygalactosamines;
   organic acid salts of polygalactosamines;
   inorganic acid salts of polygalactosamines;
   galactosamine oligomers having about 5 to 20-mers of galactosamine;
   N-acetylglucosame oligomers having about 5 to 20-mers;
   polyoxyethylene chitins;
   polyoxypropylene chitins;
   phosphated chitins; and
   dihydropropylchitins.

2. The method of claim 1, wherein the coating further comprises a tannin.

3. The method of claim 1, wherein the coating has a coating weight of 0.001 g/m² or more.

4. The method according to claim 1, wherein said coating has been also previously formed on parts of the polymerization vessel with which the monomer comes into contact during polymerization other than its inner wall surface.

5. The method according to claim 4, wherein said parts with which the monomer comes into contact comprise at least one member selected from the group consisting of a stirring shaft, stirring blades, baffles, headers, search coils and condensers.

6. The method according to claim 1, wherein said coating has been further previously formed at parts of the recovery system for unreacted monomer with which unreacted monomer comes into contact.

7. The method according to claim 1, wherein the monomer is at least one member selected from the group consisting of vinyl halides; vinyl esters; acrylic acid, methacrylic acid, and esters and salts thereof; maleic acid and fumaric acid, and esters and anhydrides thereof; diene monomers; aromatic vinyl compounds; acrylonitrile; halogenated vinylidenes; and vinyl ethers.

8. The method according to claim 1, wherein said polymerization is carried out as suspension polymerization, emulsion polymerization, solution polymerization, bulk polymerization, or gas phase polymerization.

9. The method according to claim 1, wherein said coating solution is added to the polymerization medium.

10. A polymerization vessel of which the inner wall has a coating comprising a water-soluble basic polysaccharide, said water-soluble basic polysaccharide selected from the group consisting of:
   chitosans;
   organic acid salts of chitosans;
   inorganic acid salts of chitosans;
   glucosamine oligomers having about 5 to 20-mers of glucosamine;
   polyoxyethylene chitosans;
   polyoxypropylene chitosans; phosphated chitosans;
   N-glycidyltrimethylammonium chitosans;
   dihydropropylchitosans;
   polygalactosamines;
   organic acid salts of polygalactosamines;
   inorganic acid salts of polygalactosamines;
   galactosamine oligomers having about 5 to 20-mers of aalactosamine;
   N-acetylalucosamine oligomers having about 5 to 20-mers;
   polyoxyethylene chitins;
   polyoxypropylene chitins;
   phosphated chitins; and dihydropropylchitins.

11. The method according to claim 1, wherein said inorganic acid salts of chitosans and said organic acid salts of chitosans are salts of chitosans having a deacetylization degree of 65% or more and a viscosity at 20° C., in the form of an aqueous solution containing 0.5% by weight of the chitosan and 0.5% by weight of acetic acid, of 30 cP or more when measured with a B-type viscometer.

* * * * *